(12) United States Patent
Carlioz et al.

(10) Patent No.: US 12,122,517 B2
(45) Date of Patent: Oct. 22, 2024

(54) PASSENGER MODULE, PASSENGER SEATING ARRANGEMENT

(71) Applicant: Adient Aerospace, LLC, Bothell, WA (US)

(72) Inventors: Victor Carlioz, Manhattan Beach, CA (US); Matthew Cleary, El Segundo, CA (US)

(73) Assignee: Adient Aerospace, LLC, Bothell, WA (US)

( * ) Notice: Subject to any disclaimer, the term of this patent is extended or adjusted under 35 U.S.C. 154(b) by 58 days.

(21) Appl. No.: 17/556,734

(22) Filed: Dec. 20, 2021

(65) Prior Publication Data

US 2022/0111963 A1    Apr. 14, 2022

Related U.S. Application Data

(62) Division of application No. 16/495,720, filed as application No. PCT/US2019/024780 on Mar. 29, 2019.

(60) Provisional application No. 62/770,863, filed on Nov. 23, 2018.

(51) Int. Cl.
    *B64D 11/06*     (2006.01)
    *B60N 2/01*      (2006.01)
    *B60R 7/04*      (2006.01)

(52) U.S. Cl.
    CPC ............ *B64D 11/0601* (2014.12); *B60N 2/01* (2013.01); *B60R 7/043* (2013.01); *B64D 11/0606* (2014.12); *B64D 11/0627* (2014.12)

(58) Field of Classification Search
    CPC .... B64D 11/0601; B64D 11/0606; B60N 2/01
    See application file for complete search history.

(56) References Cited

U.S. PATENT DOCUMENTS

| 2013/0010615 A1 | 1/2013 | Hui et al. |
| 2013/0106156 A1* | 5/2013 | Orson ................ B64D 11/0643 297/217.3 |

(Continued)

FOREIGN PATENT DOCUMENTS

| CN | 105270635 A1 | 1/2016 |
| CN | 108473207 A | 8/2018 |

(Continued)

OTHER PUBLICATIONS

Third Chinese Office Action, Application No. 201980002428.0, dated Apr. 1, 2022.

(Continued)

*Primary Examiner* — Michael H Wang
(74) *Attorney, Agent, or Firm* — Yee & Associates, P.C.

(57) ABSTRACT

The invention relates to a passenger module for a vehicle cabin, the passenger module comprising a first side element, a second side element, a front partition wall, and two seats arranged between the first side element and the second side element, wherein the first side element and the second side element extending parallel to each other; the seats are arranged substantially one behind another and facing substantially in a same direction; wherein the front partition wall is arranged between the seats and connects the first side element and the second side element.

18 Claims, 10 Drawing Sheets

(56) References Cited

U.S. PATENT DOCUMENTS

| | | | | |
|---|---|---|---|---|
| 2013/0248655 A1* | 9/2013 | Kroll | ............... | B64D 11/0604 244/118.6 |
| 2014/0300152 A1* | 10/2014 | Park | ............... | B64D 11/0641 297/232 |
| 2014/0306500 A1* | 10/2014 | Dryburgh | ........... | B64D 11/0601 297/232 |
| 2014/0361585 A1* | 12/2014 | Henshaw | ............... | B60N 3/002 297/217.3 |
| 2016/0016667 A1* | 1/2016 | Schmidt-Schaffer | ........................ | B64D 11/0606 244/118.6 |
| 2017/0129611 A1* | 5/2017 | Morgan | ............. | B64D 11/0643 |

FOREIGN PATENT DOCUMENTS

| | | | |
|---|---|---|---|
| EP | 2154067 | A2 | 2/2010 |
| EP | 2154067 | A3 | 6/2012 |
| EP | 3127811 | A1 | 2/2017 |
| WO | 2010100500 | A2 | 9/2010 |
| WO | 2012140515 | A1 | 10/2012 |
| WO | 2013063599 | A1 | 5/2013 |

OTHER PUBLICATIONS

"Extended Search Report Issued in European Patent Application No. 19207413.6-1010," Mailed Date: Apr. 20, 2020, 6 Pages.

"First Office Action Issued in Japanese Patent Application No. 2019-548329," Mailed Date: Jan. 29, 2021, 4 pages.

"First Office Action Issued in Chinese Patent Application No. 201980002428.0," Mailed Date: Apr. 20, 2021, 9 pages.

"Office Action Issued in European Patent Application No. 19207413.6-1010," Mailed Date: Sep. 20, 2021, 4 Pages.

"2nd Office Action Issued in Chinese Patent Application No. 201980002428.0," Mailed Date: Nov. 8, 2021, 8 Pages.

Extended European Search Report, Application No. 23167787.3, dated May 9, 2023.

* cited by examiner

PASSENGER MODULE, PASSENGER SEATING ARRANGEMENT

CROSS-REFERENCE TO RELATED APPLICATION

This application is a divisional of and claims priority to U.S. patent application Ser. No. 16/495,720, entitled "PASSENGER MODULE, PASSENGER SEATING ARRANGEMENT", filed Sep. 19, 2019, which claims priority to Patent Cooperation Treat Application No. PCT/US2019/024780, entitled "PASSENGER MODULE, PASSENGER SEATING ARRANGEMENT", filed Mar. 29, 2019, and to U.S. Provisional Application No. 62/770,863, entitled "PASSENGER MODULE, PASSENGER SEATING ARRANGEMENT", filed Nov. 23, 2018, which are incorporated by reference herein in their entireties.

FIELD

The present disclosure relates generally to a passenger module for a vehicle cabin, in particular for an aircraft cabin. The present disclosure further relates to a passenger seating arrangement for a vehicle cabin, in particular an aircraft cabin.

BACKGROUND

There are a wide variety of passenger modules and passenger seating arrangements for a vehicle cabin, in particular for an aircraft cabin known in the prior art.

For example, the European Patent Application EP 3,127,811 A1 defines an assembly of seats and an arrangement for airplanes. The assembly of seats comprises at least two rows of pairs of adjacent seats, wherein each seat being tilted in respect to the adjacent seat of a first angle obtained by the intersection of respective recline axis in a convergence point arranged rearward said pair of adjacent seats.

SUMMARY

It is an object of the present disclosure to provide an improved passenger module for a vehicle cabin, in particular for an aircraft cabin or any other passenger carrying vehicle. In particular, an advantage of the present invention is to optimize a use of space within the vehicle cabin. Further, it is an object of the present disclosure to provide an improved passenger seating arrangement and an improved vehicle cabin.

The disclosure provides a passenger module for a vehicle cabin, in particular an aircraft cabin, comprising two seats arranged between a first side element and a second side element, wherein the first side element and the second side element extending parallel to each other. Further, the seats are arranged one behind another in an offset manner and facing substantially in a same direction, wherein a front seat is positioned angled by a predefined first angle around its vertical axis in a direction towards the first side element, and a rear seat is positioned angled by a predefined second angle around its vertical axis in a direction towards the second side element.

Especially, the first angle and the second angle differ from each other. In particular, the different angles allows the front seat and the rear seat being arranged substantially one behind another as close as possible to another to create a space-saving passenger module whilst providing privacy to each front and rear seat passenger.

According to another aspect, each seat has a direct access, in particular a passenger access path, to an aisle of the vehicle cabin. A stepping over a leg rest of a neighbouring seat when the neighbouring seat is in a fully reclined position is avoided. Thereby, privacy for each passenger is increased.

In particular, the first angle is an included angle between the first side element and a respective seat axis which runs through the vertical axis of the front seat defining a pointing and extension direction of the seat. The second angle is an included angle between the second side element and a respective seat axis which runs through the vertical axis of the rear seat defining a pointing and extension direction of the seat.

For example, the first side element is arranged adjacent a cabin wall and the second side element is arranged adjacent an aisle, wherein the first and second side elements are extending parallel to each other. Thereby, the pointing and extension direction of the front seat is directed substantially towards the cabin wall. The pointing and extension direction of the rear seat is directed substantially towards the aisle.

Advantageously, at least a density of passenger seats within the vehicle cabin, hereafter also termed as cabin, can be optimized whilst ensuring a high comfort space to each passenger. Particularly, by using the passenger module according to the invention a high density business class seating arrangement can be created while offering direct access to an aisle for all passengers including the passenger located along a window side of the cabin.

Moreover, an optical appearance of an interior of the cabin including a plurality of identical passenger modules can be improved. Furthermore, an overall assembly can be simplified by mounting and arranging identical passenger modules due to a repeating pattern configuration. In particular, stacking a number of the disclosed passenger module allows a new arrangement of business class seats which offer comfortable seating positions as well as enough space for a comfortable full flat-bed position for a corresponding passenger. Furthermore, stacking a number of the disclosed passenger module allows optimized usage of vehicle cabins, in particular airline cabins, whilst offering as much comfort as possible as well as arranging comparatively a higher number of seats as possible providing more seats for each flight.

In one embodiment, an extension direction of each first and second side element is aligned with a longitudinal axis of the vehicle cabin. Further, the first and second side elements are arranged distanced from each other in a transverse direction of the vehicle cabin.

According to an embodiment, the passenger module comprises a rear partition wall which is configured, starting from the first side element, to extend behind the rear seat in the direction towards the second side element. In case of arranging two identical passenger modules behind another, the rear partition wall defines a separation between a front passenger module and a rear passenger module. A rear side of the rear partition wall can therefore comprise a monitor and/or storage units for a front seat passenger of the rear passenger module.

In a possible embodiment, the passenger module comprises a front partition wall which is configured, starting from the first side element, to extend between the rear seat and the front seat in the direction towards the second side element, and which is configured to separate a rear passenger seating area and a front passenger seating area.

According to another embodiment, the front partition wall is configured to form a continuously running wall between the first side element and the second side element. That means that the front seat and the rear seat are fully separated in the transverse direction.

In another embodiment of the passenger module, a passenger access path and legroom for a passenger of the rear passenger seating area are formed within the rear passenger seating area extending between the front partition wall and the rear partition wall.

In a further embodiment of the passenger module, legroom for a passenger of the front seat is provided directly in front of the front seat, wherein a passenger access path connecting the legroom is formed extending along the front partition wall in the direction towards the second side element.

Each passenger seating area comprises its own and personal passenger access path and legroom.

In accordance with a further embodiment of the passenger module, the first angle comprises about 5° to 18°, preferably about 10° to 15°, with respect to the first side element. In particular, the front seat is positioned angled about the first angle with respect to the first side element.

According to a further possible embodiment, the second angle comprises about 20° to 40°, preferably about 25° to 35°, with respect to the second side element. In particular, the rear seat is positioned angled about the second angle with respect to the second side element.

In another embodiment, each seat is configured as being adjustable between at least a seating position and at least a bed position. According to the adjustable seat of the present invention, the seat is formed by at least a seat pan and a backrest. Additionally, the seat may comprise optionally a leg-rest. For instance, the seat can be brought into one or more positions, e.g. into a taxi, take-off, landing position, designated as "TTL" or "TT&L"-position, an inclined position or a sleeping position. Particularly, in the sleeping position the seat pan, the backrest and optionally the leg-rest are brought into a substantially flat, horizontal position.

The taxi, takeoff and landing position of the seat is a position in which the backrest is in a substantial upright position with respect to the seat pan. In particular, the backrest is arranged substantially perpendicular to a horizontally arranged seat pan. The leg-rest is also arranged substantially perpendicular to the horizontally arranged seat pan. For example, the backrest is positioned angled about 3° to 12° with respect to a vertical axis. The leg-rest can be positioned angled about 0° with respect to the vertical axis. It is understood that the vertical axis is an axis running parallel to a yaw axis of the aircraft cabin.

The inclined position of the seat is a comfort position in which the backrest and/or the leg-rest are tilted with respect to the seat pan. For example, the backrest is positioned angled about more than 12° and less than 85° with respect to the vertical axis. The leg-rest can be positioned angled about more than 0° and less than 85° with respect to the vertical axis.

The sleeping position of the seat is a position in which the backrest and the seat pan and optionally the leg-rest are arranged horizontally aligned to each other forming a horizontal, flat bed. For example, the backrest is positioned angled about more than 85° to 90° with respect to the vertical axis. The leg-rest can be positioned angled of about 90° with respect to the vertical axis.

Relating to an embodiment of the passenger module, the first side element is configured as a front console element and a rear console element arranged adjacent to each seat and each console element at least comprising a utility surface and/or storage compartments for a corresponding passenger of each seat. For example, the first side element is configured as a two-part element, wherein the first side element is assembled from the front console element and the rear console element.

In another possible embodiment, the second side element is configured as a compartment element having a footwell for a rear seat passenger.

According to a further embodiment of the passenger module, the compartment element comprises a movable tray table for the rear seat passenger, wherein the tray table is stowed within the compartment element in a non-use position and is deployed towards the rear seat in a use-position. For instance, the tray table is bi-foldable. Alternatively, the tray table comprises dimensions which correspond to dimensions of the second side/compartment element. When two identical passenger modules are arranged one behind another, the first side element comprises a movable tray table for a front seat passenger of the rear passenger module, wherein the tray table is stowed within the first side element in a non-use position and is deployed towards the front seat in a use-position.

The disclosure further relates to a passenger seating arrangement for a vehicle cabin comprising at least two identical passenger modules as described above and hereafter.

For instance, the passenger modules are arranged one behind another in a longitudinal direction of the vehicle cabin and/or adjacent to each other in a transverse direction of the vehicle cabin.

According to an embodiment of the passenger seating arrangement, each first side element is arranged adjacent a cabin wall of the vehicle cabin and each second side element is bordering an aisle of the vehicle cabin.

When at least two passenger modules are arranged behind another the front passenger seating area of a rear passenger module, its corresponding legroom and passenger access path are delimited by the rear partition wall of the front passenger module.

When two passenger modules are arranged adjacent to each other the passenger modules are separated by the aisle and are arranged symmetrically identical with respect to a central axis of the aisle.

In another embodiment, when at least two passenger modules are arranged behind another the first side element of the front passenger module comprises a footwell for the front seat passenger of the rear passenger module. In particular, the first side element is configured as a two-part element which is assembled from a rear seat console and a front seat console. For example, when at least two passenger modules are arranged behind another at least the rear seat console of the front passenger module comprises a footwell for the front seat passenger of the rear passenger module.

In a further embodiment, the front seat console element and the rear seat console element of the front passenger module are configured to form an extended footwell for the front seat passenger of the rear passenger module. For example, the front seat console element comprises an open space which is connected to the rear seat console element to extend the footwell. Each of the console elements can comprise a support surface portion which are connected to each other to form a seat pan and optionally a leg-rest extension portion when the seat is in the sleeping-position.

Furthermore, the disclosure relates to a vehicle cabin, in particular an aircraft cabin, comprising a passenger seating arrangement as described above. For example, the vehicle cabin comprises at least two columns arranged along the cabin wall and at least one aisle arranged between the two columns.

BRIEF DESCRIPTION OF THE DRAWINGS

The present disclosure will become more fully understood from the detailed description given herein below and the accompanying drawings which are given by way of illustration only, and thus, are not limitative of the present disclosure, wherein.

Corresponding parts are marked with the same reference symbols in all figures.

DETAILED DESCRIPTION

Figure 1:
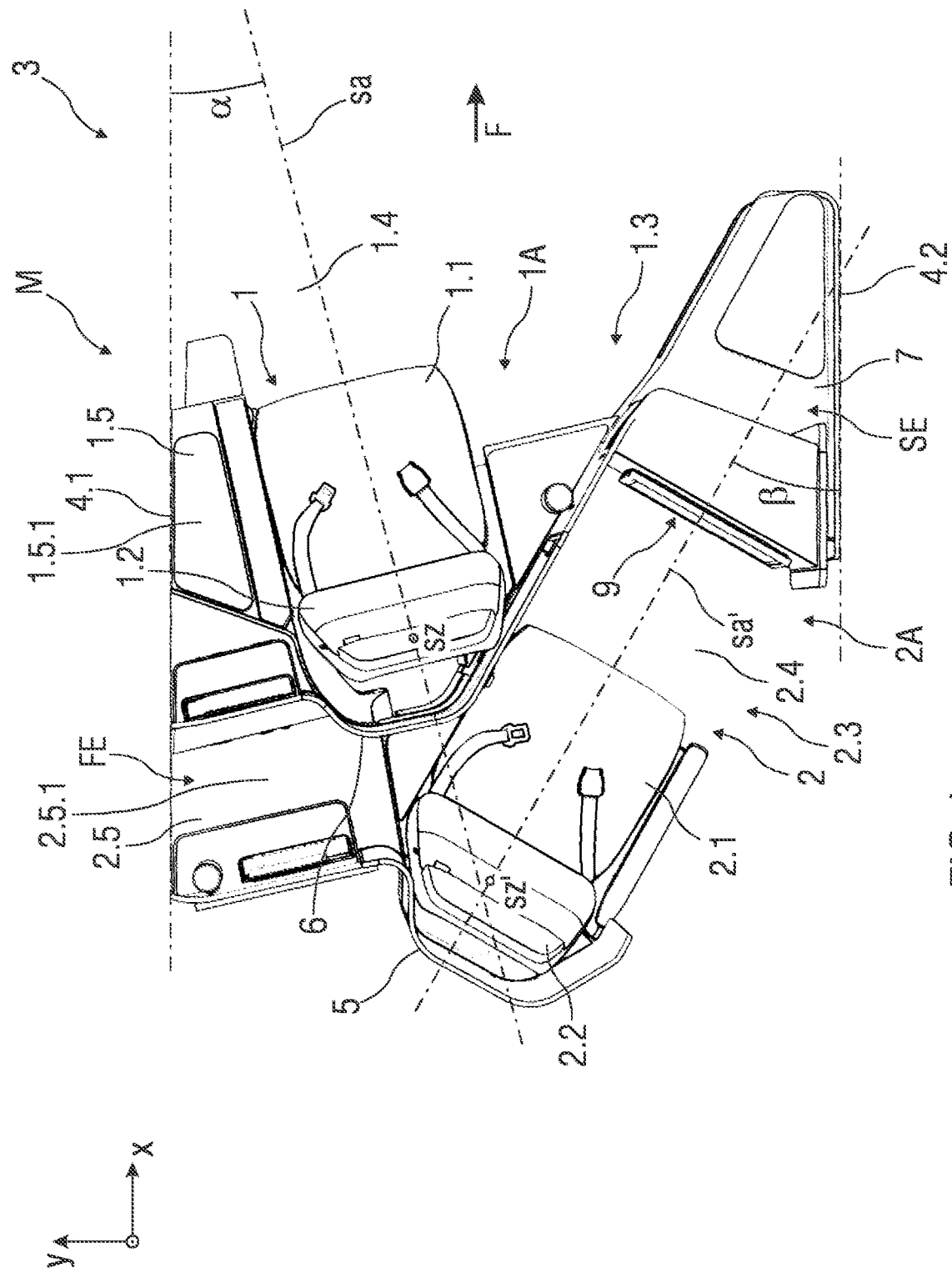
FIG. 1 shows schematically a top view of an embodiment of a passenger module comprising two seats in a TTL-position.
Figure 2:
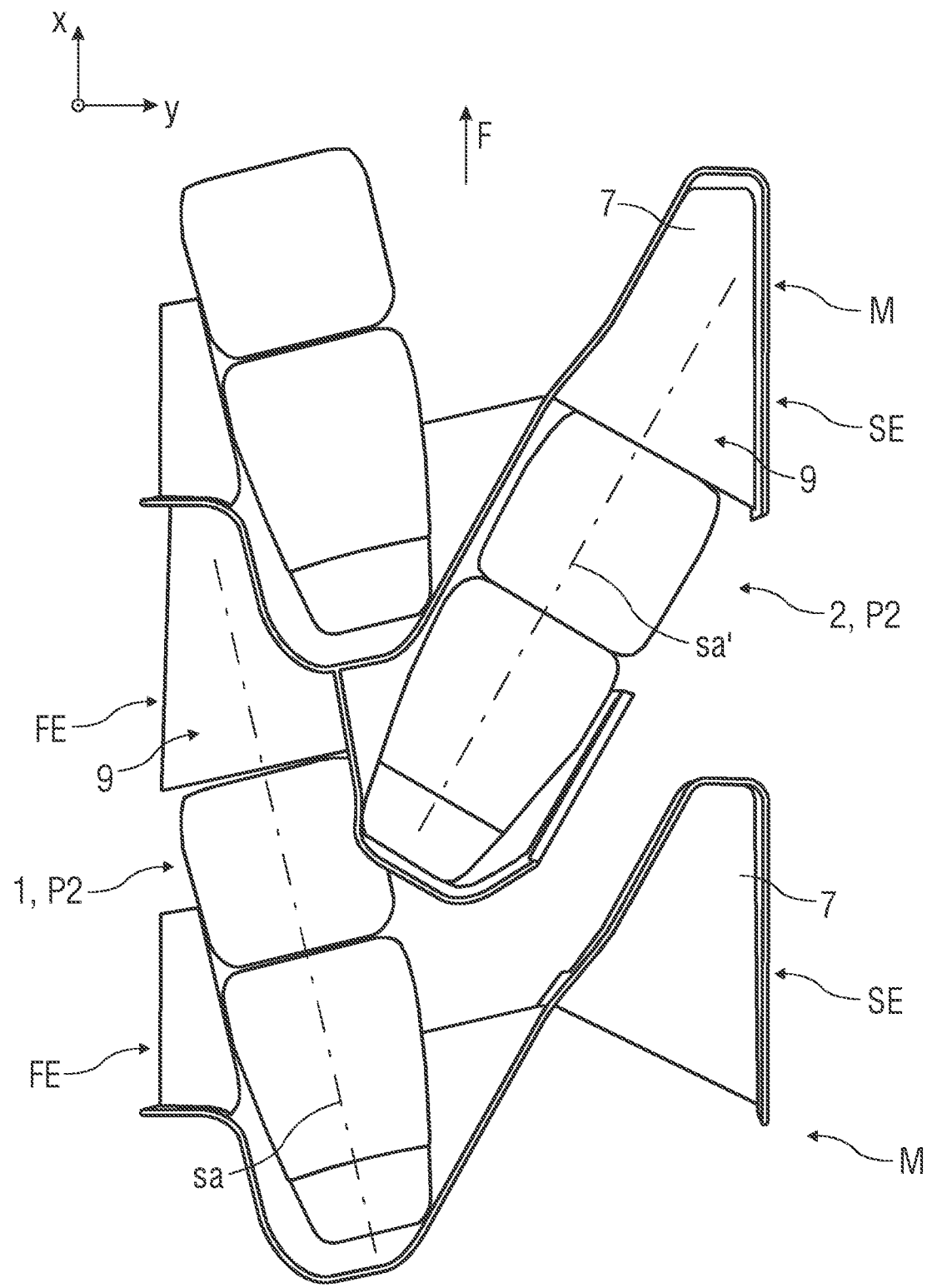
FIG. 2 shows schematically a top view of an embodiment of the passenger module comprising two seats in a sleeping-position.

FIGS. 1 and 2 each shows schematically a top view of an embodiment of a passenger module M comprising two seats 1, 2, wherein FIG. 1 shows each seat 1, 2 in a so-called TTL-position P1 and FIG. 2 shows two passenger modules M arranged behind one another, wherein each seat 1, 2 is shown in a sleeping-position P2.

For a better understanding of subsequent descriptions of the passenger module M a coordinate system is shown in further figures. The coordinate system comprises a longitudinal axis x, a transverse axis y and a vertical axis z in relation to an aircraft. In particular, the longitudinal axis x defines a longitudinal direction and length of a vehicle cabin 3 and corresponds to a central axis ca, e.g. a cabin axis, the transverse axis y defines a transverse direction and width of the vehicle cabin 3 and the vertical axis z defines a vertical direction and height of the vehicle cabin 3. Exemplarily, a flight direction F is shown in further figures.

A number of passenger modules M are arranged within the vehicle cabin 3. The passenger modules M may be fitted and positioned in various arrangements, e.g. in a staggered and angled arrangement, in the vehicle cabin 3. In particular, the passenger modules M are configured as a repeating pattern of pairs of seats 1, 2. One of the seats 2 is substantially arranged behind the other seat 1.

The passenger module M comprises a first side element FE and a second side element SE. The first side element FE and the second side element SE are arranged distanced from each other while extending parallel to each other. In particular, the first and second side elements FE, SE are extending parallel to the longitudinal axis x. For instance, each of the side elements FE, SE comprises outer side walls 4.1, 4.2. Particularly, each outer side wall 4.1, 4.2 is arranged extending parallel to the longitudinal axis x.

Each module M defines a pair of seats 1, 2. For a repeating pattern of pairs of seats 1, 2 a number of modules M are arranged one behind another.

Further, the seats 1, 2 are arranged one behind another with respect to the longitudinal direction. The seats 1, 2 are arranged in an offset manner, in particular with respect to the transverse axis y. With other words: The seats 1, 2 are arranged one behind another in a staggered manner. This arrangement of the seats 1, 2 allows a more dense arrangement relating to the longitudinal and transverse dimension of the whole passenger module M.

The seats 1, 2 are both facing substantially in a same direction. In particular, the seats 1, 2 are both forward facing with respect to the flight direction F.

Each seat 1 and 2 has a direct access, in particular a respective passenger access path 1.3 and 2.3, to an aisle of the vehicle cabin 3. In the shown embodiment the seat 1 is positioned at a cabin wall 3.1 or window side of the vehicle cabin 3 and angled toward the cabin wall 3.1 with a first angle α. The seat 2 behind the other seat 1 is arranged next to an aisle 3.2 of the cabin 3 and angled toward the aisle 3.2 of the vehicle cabin 3 with a greater second angle β than the first angle α. This greater second angle β open a greater passenger access path 1.3 for direct access to the seat 1 arranged at the cabin wall 3.1. A stepping over of the neighbouring seat 2 arranged at the aisle 3.2 when the neighbouring seat 2 is in a fully reclined position is avoided (see also the various embodiments of FIGS. 2 to 5).

The seats 1, 2 are divided into a front seat 1 and a rear seat 2, wherein the front seat 1 is arranged in front of the rear seat 2 in view of the longitudinal and flight direction F. Both seats 1, 2 are arranged between the first side element FE and the second side element SE.

The front seat 1 is positioned angled by the predefined first angle α around its own vertical axis sz in a direction towards the first side element FE. The rear seat 1 is positioned angled by the predefined second angle β around its own vertical axis sz' in a direction towards the second side element SE. In particular, the seats 1, 2 are positioned angled in a direction pointing away from each other.

In particular, the predefined first angle α of the front seat 1 differs from the predefined second angle β from the rear seat 2. For instance, the predefined angle β is greater than the predefined angle α. This allows an improved longitudinal and transversal staggering of the seats 1, 2 within the passenger module M.

For example, the front seat 1 is positioned at an angle α of about 5° to 18°, preferably about 10° to 15°, with respect to the first side element FE. In the shown embodiment, the angle α comprises about 13°.

The rear seat 2 is positioned at an angle β of about 20° to 40°, preferably about 25° to 35°, with respect to the second side element SE. In the shown embodiment, the angle β comprises about 31°.

In particular, the first angle α is an included angle between the first side element FE and a respective seat axis sa which runs through the vertical axis sz of the front seat 1 defining a pointing and extension direction of the seat 1. The second angle β is an included angle between the second side element SE and a respective seat axis sa' which runs through the vertical axis sz' of the rear seat 2 defining a pointing and extension direction of the seat 2. Particularly, each outer side wall 4.1, 4.2 defines a reference axis for each respective seat axis sa, sa' to define each angle α, β.

Figure 5:
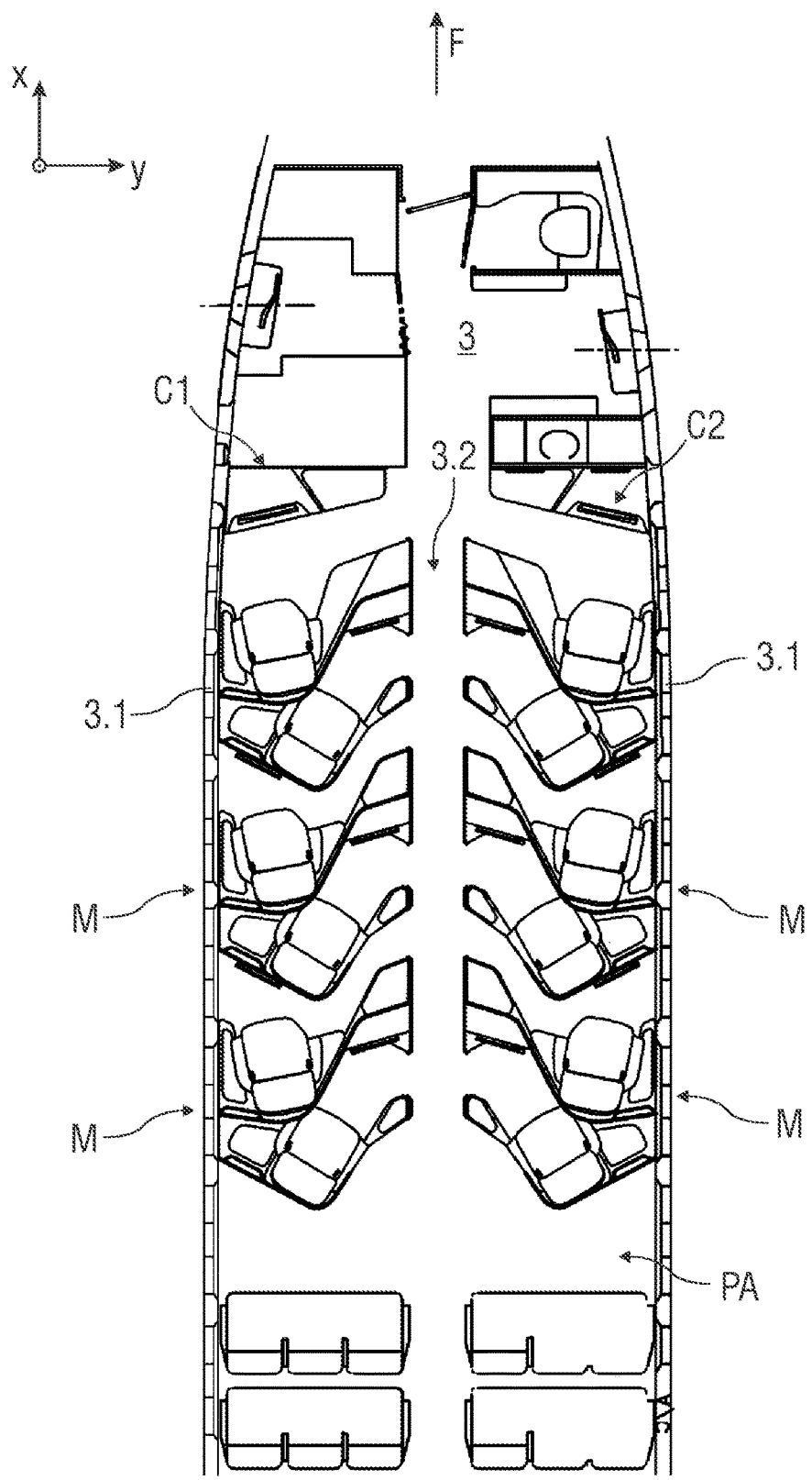
FIG. 5 shows schematically a top view of an embodiment of a vehicle cabin having a passenger seating arrangement with a plurality of identical passenger modules.

For example, the first side element FE is arranged adjacent a cabin wall 3.1 as shown in FIG. 5 and the second side element SE is arranged adjacent the aisle 3.2 as shown in FIG. 5, wherein the first and second side elements FE, SE are extending parallel to each other. Thereby, the respective seat axis sa, particularly the pointing and extension direction of the front seat 1 is directed substantially towards the cabin wall 3.1. The respective seat axis sa', particularly the pointing and extension direction of the rear seat 2 is directed substantially towards the aisle 3.2.

The seats 1, 2 are movable, in particular convertible into lie-flat beds. Each seat 1, 2 is formed by at least a seat pan 1.1, 2.1 and a backrest 1.2, 2.2. In particular, the rear seat 2 is arranged behind the front seat 1 in such manner that the seat pan 2.1 is arranged substantially behind the backrest 1.2 of the front seat 1 in view of the longitudinal direction. Due to opposite angled positions of the seats 1, 2, there is a small overlap portion in the transverse direction between the seat pan 2.1 and the backrest 1.2.

Optionally, each seat 1, 2 may comprise an additional leg-rest. For instance, each seat 1, 2 can be brought into one or more positions, e.g. into a taxi, take-off, landing position, designated as "TTL" or "TT&L"-position P1, an inclined position and/or a sleeping-position P2. Particularly, in the sleeping-position P2 the seat pan 1.1, 2.1, the backrest 1.2, 2.2 and optionally the leg-rest are brought into a substantially flat, horizontal position.

The seats 1, 2 are movable along their respective seat axis sa, sa' between the TTL-position P1 and the sleeping-position P2. It is to be understood that the respective seat axis sa, sa' corresponds to a longitudinal extension direction of each seat 1, 2. For instance, the respective seat axes sa, sa' intersects in a convergence point behind the front seat 1. In particular, due to the advantageous staggered arrangement of the described angled seats 1, 2 (slightly offset arrangement and densely arranged one behind another) the convergence point is in a backrest area of the rear seat 2.

The passenger module M comprises a rear partition wall 5 which is configured, starting from the first side element FE, to extend behind the rear seat 2 in the direction towards the second side element SE.

Further, the passenger module M comprises a front partition wall 6 which is configured, starting from the first side element FE, to extend between the rear seat 2 and the front seat 1 in the direction towards the second side element SE, and which is configured to separate a rear passenger seating area 2A and a front passenger seating area 1A. Thereby, due to the greater angle β the passenger access path 2.3 (egress) to access the rear seat 2 can be achieved within the rear passenger seating area 2A. In particular, the passenger access path 2.3 is arranged between the rear partition wall 5 and the front partition wall 6.

Further, legroom 2.4 for a passenger of the rear passenger seating area 2A is formed within the rear passenger seating area 2A. Both, the passenger access path 2.3 and the legroom 2.4 are module-internal.

The passenger access path 1.3 for a passenger of the front seat 1 is arranged extending along the front partition wall 6 in the direction towards the second side element SE. Legroom 1.4 for the passenger of the front seat 1 is provided directly in front of the front seat 1, wherein the passenger access path 1.3 is connecting the legroom 1.4. Thereby, it could be said that the passenger access path 1.3 and the legroom 1.4 are module-external.

Furthermore, the first side element FE is configured as a front console element 1.5 and a rear console element 2.5 arranged adjacent to each seat 1, 2 and each console element 1.5, 2.5 comprises at least a utility surface and/or storage compartments for a corresponding passenger of each seat 1, 2.

In a repeating pattern, wherein at least two identical passenger modules M are arranged behind another, the console elements 1.5 to 2.5 are all arranged behind another. For example, the console elements 1.5 to 2.5 are arranged behind another at the cabin wall 3.1. In particular, the console elements 1.5 to 2.5 are substantially aligned with the cabin wall 3.1 and extending along the cabin wall 3.1. Further, the front console element 1.5 is arranged in front of the corresponding rear console element 2.5. For example, the front console element 1.5 and the rear console element 2.5 are separated by the partition wall 6.

In an embodiment, the front console element 1.5 and the rear console element 2.5 are forming a substantially connected unit in their extending direction.

The utility surface for the corresponding passenger of the each seat 1, 2 is provided by an upper surface 1.5.1, 2.5.1 of each console element 1.5, 2.5. For example, the utility surface can comprise a shelf, a table, storage space and storage means. The storage means can provide storage space for a remote control, magazines, suitcases, shoes, headphones or other items belonging to the passenger or airline. Additionally, the utility surface can comprise service and operational elements, such as switches and HMI-panel to control operable features of each passenger seating area 1A, 2A.

Figure 9:
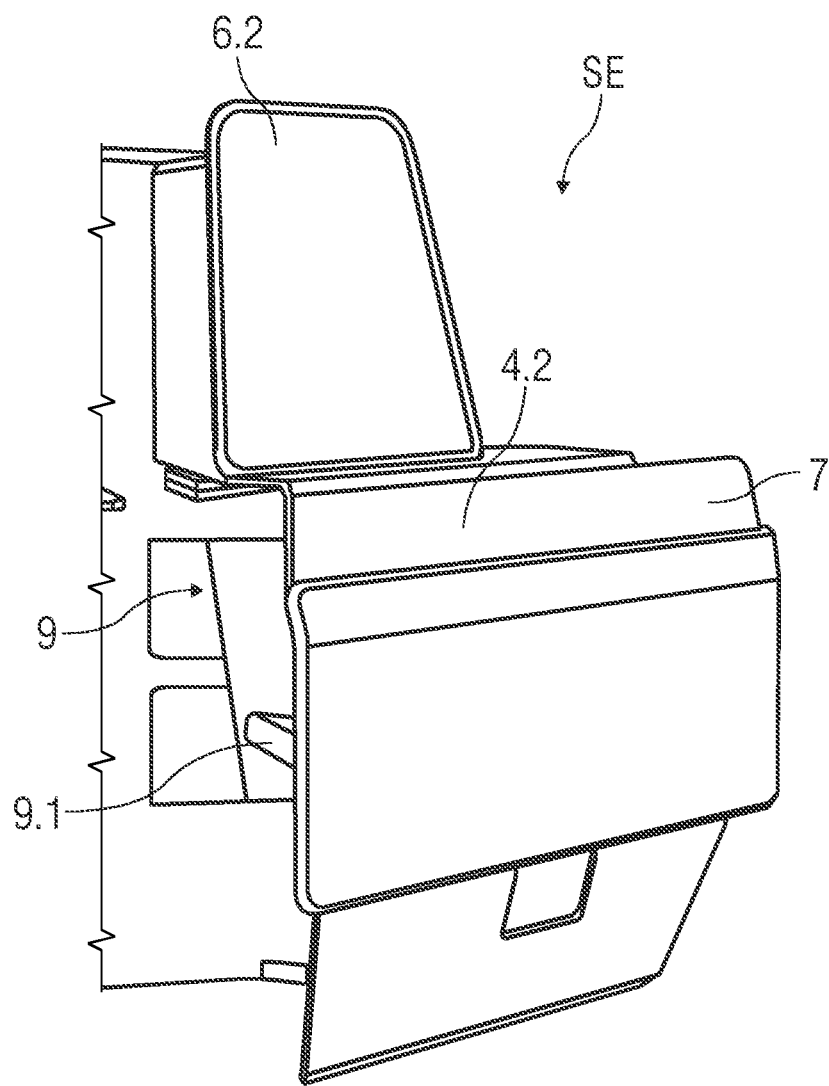
FIG. 9 shows schematically a perspective view of a side element of the passenger module.

Additionally, the second side element SE is configured as a compartment element 7 having a footwell 9 for the passenger of the rear seat 2. For instance, the adjustable seat 2 can be brought into the sleeping-position P2, in particular a bed position, such that the seat 2 is partially projecting into the footwell 9. Therefore, the compartment element 7 and a footwell space can be seen as an extension space for the rear passenger. When the seat is brought into the sleeping-position P2, the seat pan 2.1 or optionally a leg-rest can come into contact with a support surface portion 9.1 arranged inside the footwell 9 as shown in FIG. 9 such that a sleeping surface is extended for the rear passenger. The support surface portion 9.1 has a corresponding shape with a shape of the seat pan 2.1 or optionally the leg-rest.

Figure 3:
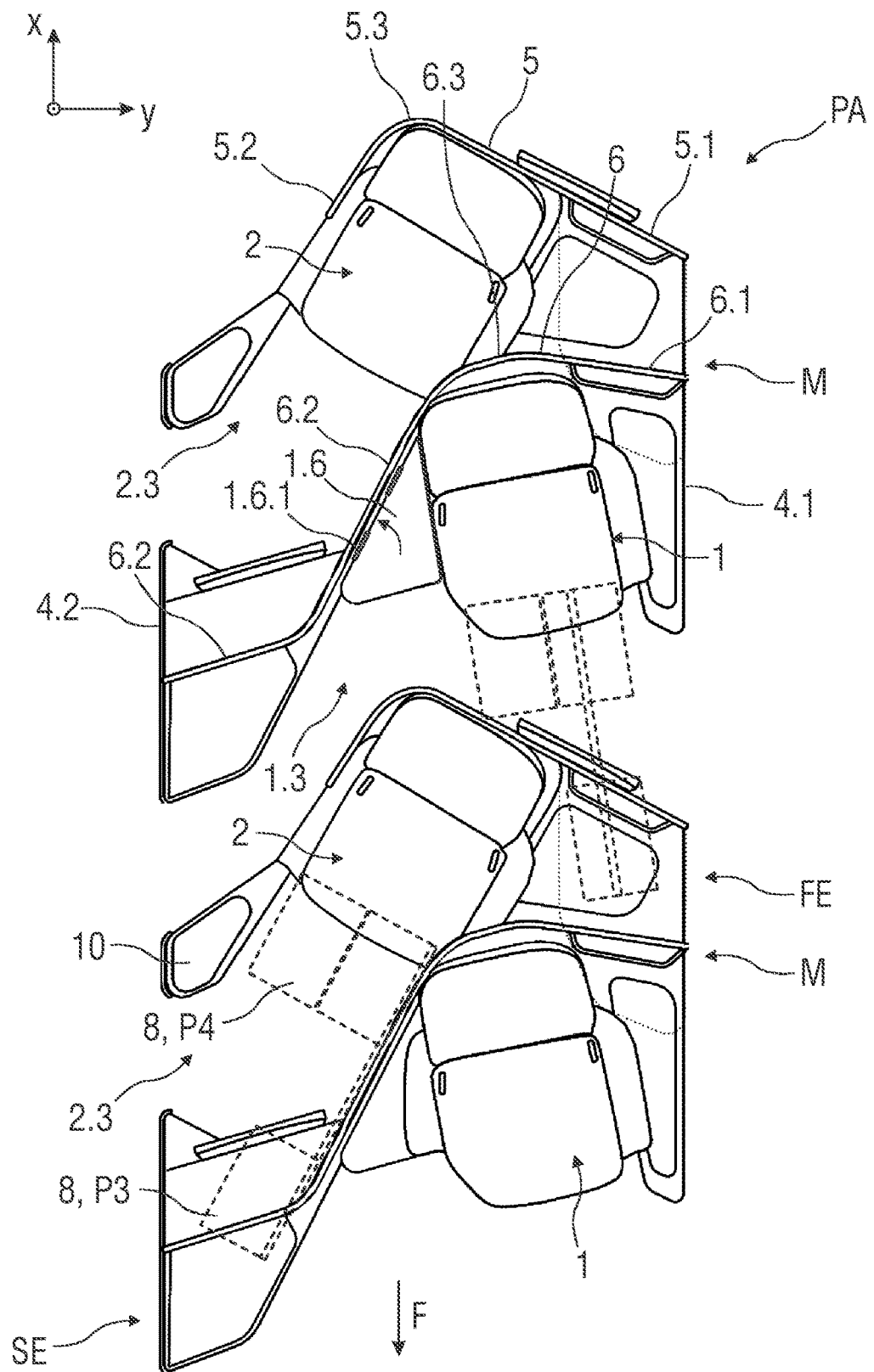
FIG. 3 shows schematically a top view of an embodiment of a passenger seating arrangement comprising two passenger modules arranged one behind another.

FIG. 3 shows schematically a top view of an embodiment of a passenger seating arrangement PA comprising two passenger modules M arranged one behind another.

When two passenger modules M are arranged behind another the front passenger seating area 1A of a rear passenger module M, its corresponding legroom 1.4 and passenger access path 1.3 are delimited by the rear partition wall 5 of the front passenger module M.

When two passenger modules M are arranged behind another the rear seat console element 2.5 of the front passenger module M comprises a footwell 9 for the passenger of the front seat 1 of the rear passenger module M. Further, each console element 1.5, 2.5 can comprise the support surface portion 9.1 as shown in FIG. 9 which is fixed inside the footwell space.

In one embodiment, the front seat console element 1.5 and the rear seat console element 2.5 of the front passenger module M are configured to form an extended footwell for the passenger of the front seat 1 of the rear passenger module M.

In the shown embodiment, the compartment element 7 comprises a movable tray table 8 for the passenger of the rear seat 2, wherein the tray table 8 is stowed within the compartment element 7 in a non-use position P3 and is deployed towards the rear seat 2 in a use-position P4. For instance, the tray table 8 is bi-foldable. In the stowed non-use position P3, the tray table 8 is folded to form a smaller stowable table surface. In the deployed use-position P4 the tray table 8 can be unfolded, e.g. turned, swung or opened up, by the passenger to form a bigger usable table surface.

Further, in an exemplary embodiment, an armrest 1.6 is arranged within the at least one of the passenger seating areas 1A, 2A. The armrest 1.6 can be seen in FIG. 3 within the front passenger seating area 1A of the rear passenger module M. The armrest 1.6 is substantially triangular-shaped. In particular, the armrest 1.6 is positioned adjacent to the seat 1 on a seat side oriented towards the passenger access path 1.3. As seen, the armrest 1.6 is fitted into a gap formed between the partition wall 6 and the seat 1.

For example, each partition wall 5, 6 is configured, starting from the first side element FE, to comprise a substantially first wall section 5.1, 6.1. The first wall section 5.1, 6.1 extends straight from the first side element FE towards the corresponding seat 1, 2, in particular toward a rear portion of each backrest 1.2, 2.2. Each partition wall 5, 6 comprises a second wall section 5.2, 6.2 which is angled away from the first wall section 5.1, 6.1 in the direction towards the second side element SE. The second wall section 5.2, 6.2 extends substantially straight. For instance, the second side element SE is positioned offset from the first side element FE with respect to the longitudinal direction and flight direction F. The second wall section 5.2, 6.2 extends behind the seat 1, 2 towards the offset, more forwardly arranged second side element SE. Additionally, each partition wall 5, 6 comprises an optional curved section 5.3, 6.3 which is configured connecting the first wall section 5.1, 6.1 and the second wall section 5.2, 6.2. Particularly, each curved section 5.3, 6.3 is configured to at least partially enclose the backrest 1.2, 2.2 and/or to extend behind, in particular along, the rear portion of the backrest 1.2, 2.2.

Moreover, the front partition wall 6 is configured to form a continuously running wall between the first side element FE and the second side element SE. That means that the front seat 1 and the rear seat 2 are fully separated in the transverse direction. Therefore, the second wall section 6.2 of the front partition wall 6 is extended towards the second side element SE. In particular, the front partition wall 6 connects the first side element FE and the second side element SE. According to an embodiment, the front partition wall 6 is configured to continuously extend between the outer side walls 4.1, 4.2 of the side elements FE, SE. For example, the front partition wall 6 is configured to connect the outer side walls 4.1, 4.2 of the first and second side elements FE, SE.

The second wall section 6.2 of the front partition wall 6 is extending away from the front seat 1 towards the second side element SE, whereas the front seat 1 is positioned angled in the direction towards the first side element FE. Thus, the gap is formed between the front seat 1 and the second wall section 6.2 of the front partition wall 6. To support an entrance to and an egress from the seat 1, the armrest 1.6 is tiltable. In particular, the armrest 1.6 is configured as a hinged armrest 1.6. The armrest 1.6 is tiltable arranged on the front partition wall 6, particularly movable fixed to a front surface of the front partition wall 6. For instance, the armrest 1.6 is tiltable attached to the second wall section 6.2 via hinge elements 1.6.1 or the like.

The armrest 1.6 rotates up to go against the front partition wall 6, in particular against the front surface of the second wall section 6.2 of the front partition wall 6. A top surface which is used to support arms of the front seat passenger aligns with the front surface of the second wall section 6.2 in a upwards rotated position, particularly a stowed position. In a use position, the armrest 1.6 is rotated downwards away from the front partition wall 6. The stowed armrest position allows a more comfortable egress and entrance and a greater egress and entrance space from/to the seat 1. Moreover, a stowed armrest 1.6 allows a creation of a free vertical space adjacent to the seat 1, for example when the seat 1 is in sleeping-position P2.

In the shown embodiment, an access divider element 10 is provided to separate the passenger access path 1.3, 2.3 when at least two passenger modules M are arranged behind another. The access divider element 10 is, for example, shaped as a wall-like element which extends from the rear partition wall 5 towards the second side element SE. The access divider element 10 separates the front passenger access path 1.3 from the rear passenger access path 2.3 in the longitudinal direction. For example, the access divider element 10 creates private passenger access paths 1.3, 2.3. The access divider element 10 is an optional element.

Figure 4:
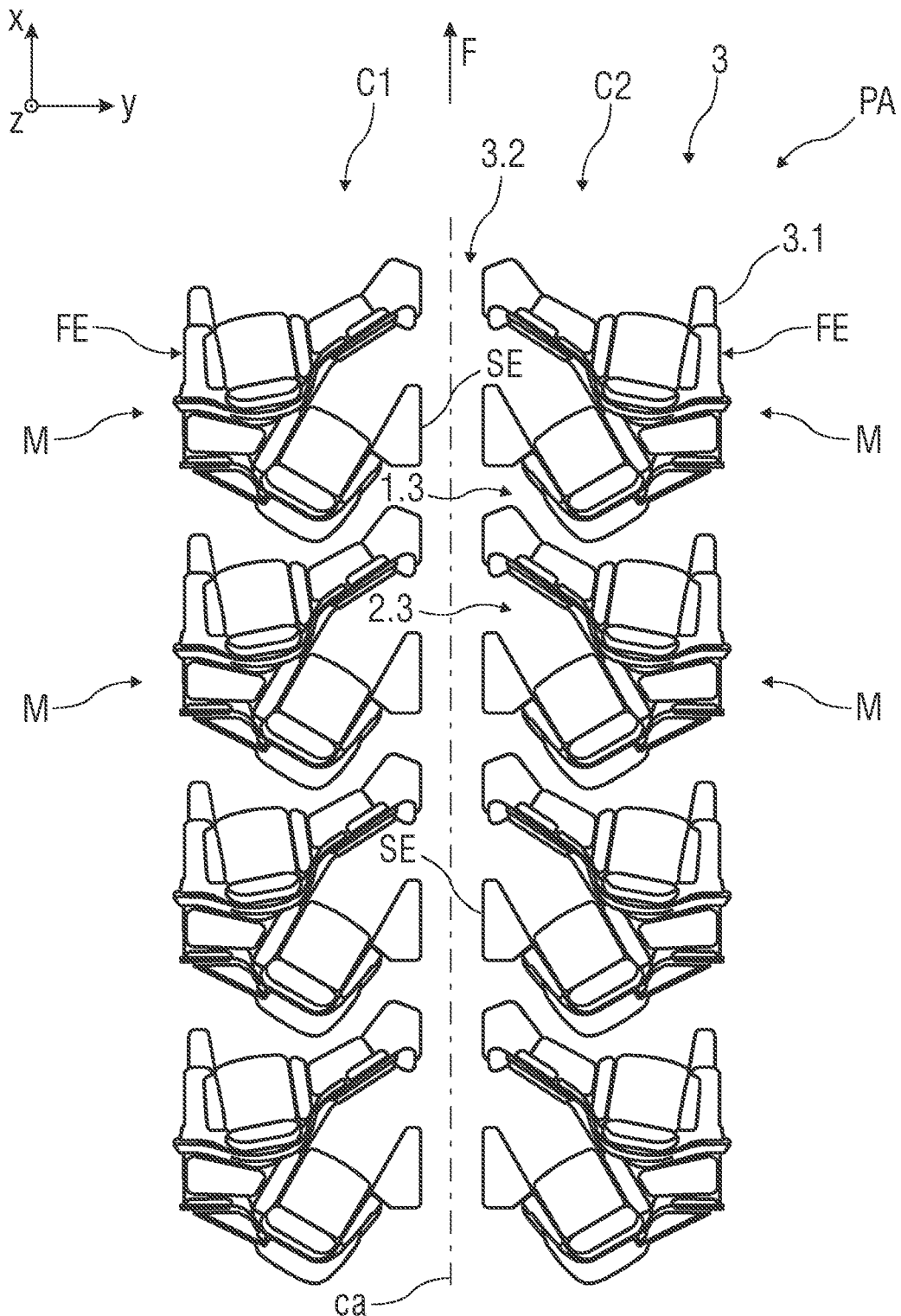
FIG. 4 shows schematically a top view of an embodiment of a passenger seating arrangement comprising a plurality of identical passenger modules.

FIG. 4 shows schematically a top view of an embodiment of a passenger seating arrangement PA comprising a plurality of identical passenger modules M.

In the shown embodiment, the passenger modules M are arranged one behind another in a longitudinal direction of the vehicle cabin 3 and adjacent to each other in a transverse direction of the vehicle cabin 3.

In particular, each first side element FE is configured to be arranged adjacent a cabin wall 3.1 of the vehicle cabin 3 and each second side element SE is configured bordering an aisle 3.2 of the vehicle cabin 3.

The identical passenger modules M are arranged along two columns C1, C2, wherein the columns C1, C2 are separated by the aisle 3.2. Particularly, the passenger modules M are separated by the aisle 3.2 and are arranged symmetrically identical with respect to the central axis ca of the aisle 3.2. That means, the passenger modules M of the first column C1 are all mirrored around the central axis ca or vice versa.

FIG. 5 shows schematically a top view of an embodiment of the vehicle cabin 3 having the passenger seating arrangement PA with a plurality of identical passenger modules M.

The shown vehicle cabin 3 comprises the two columns C1, C2 each arranged along a cabin wall 3.1, wherein the aisle 3.2 is arranged between the two columns C1, C2.

In particular, a so-called 2-2 passenger seating arrangement PA for a narrow cabin body is shown. The passenger modules M are arranged one behind another in each column C1, C2.

Depending on an interior space of the vehicle cabin 3, a number of passenger modules M can be varied. Further, the number of passenger modules M can varied as desired by e.g. an airline itself. The term "interior space" is understood as comprising dimensions of the vehicle cabin 3, in particular a length and a width of at least a passenger carrying compartment of the vehicle. The length of the passenger carrying compartment affects a length of each column C1, C2, in particular the number of passenger modules M arranged behind each other within each column C1, C2. The width of the passenger carrying compartment affects a number of columns C1, C2 arranged next to each other in a transverse direction of the vehicle cabin 3. For instance, the cabin 3 can comprise one or more outer columns C1, C2 along each vehicle cabin wall 3.1 and one or more center columns arranged between the outer columns C1, C2. Thereby, the center columns can be separated from the outer columns C1, C2 and/or from each other by aisles.

Figure 6:
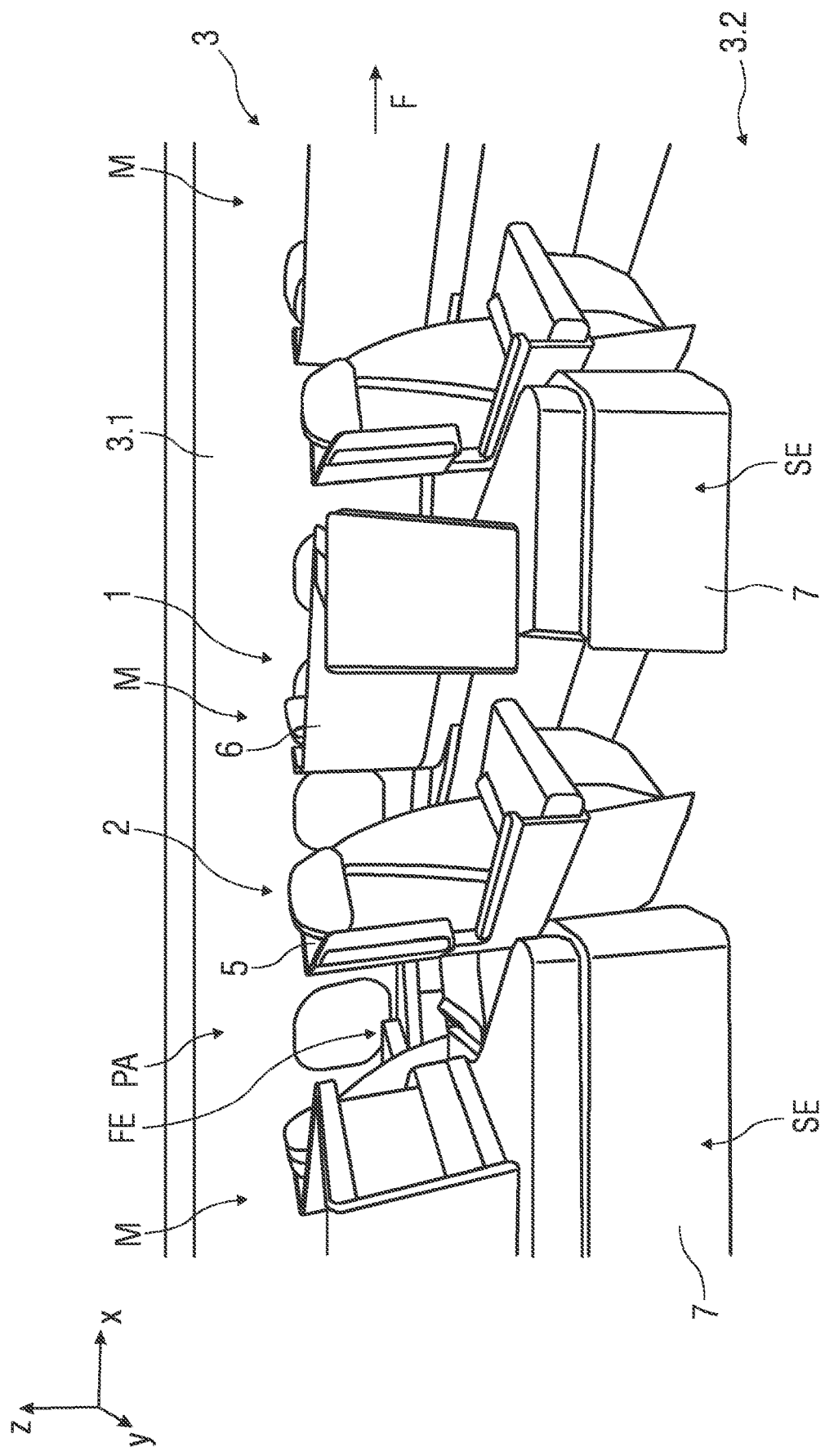
FIG. 6 shows schematically a perspective view of an embodiment of a passenger seating arrangement within the vehicle cabin.

FIG. 6 shows schematically a perspective view of an embodiment of the passenger seating arrangement PA within the vehicle cabin 3.

Figure 7:
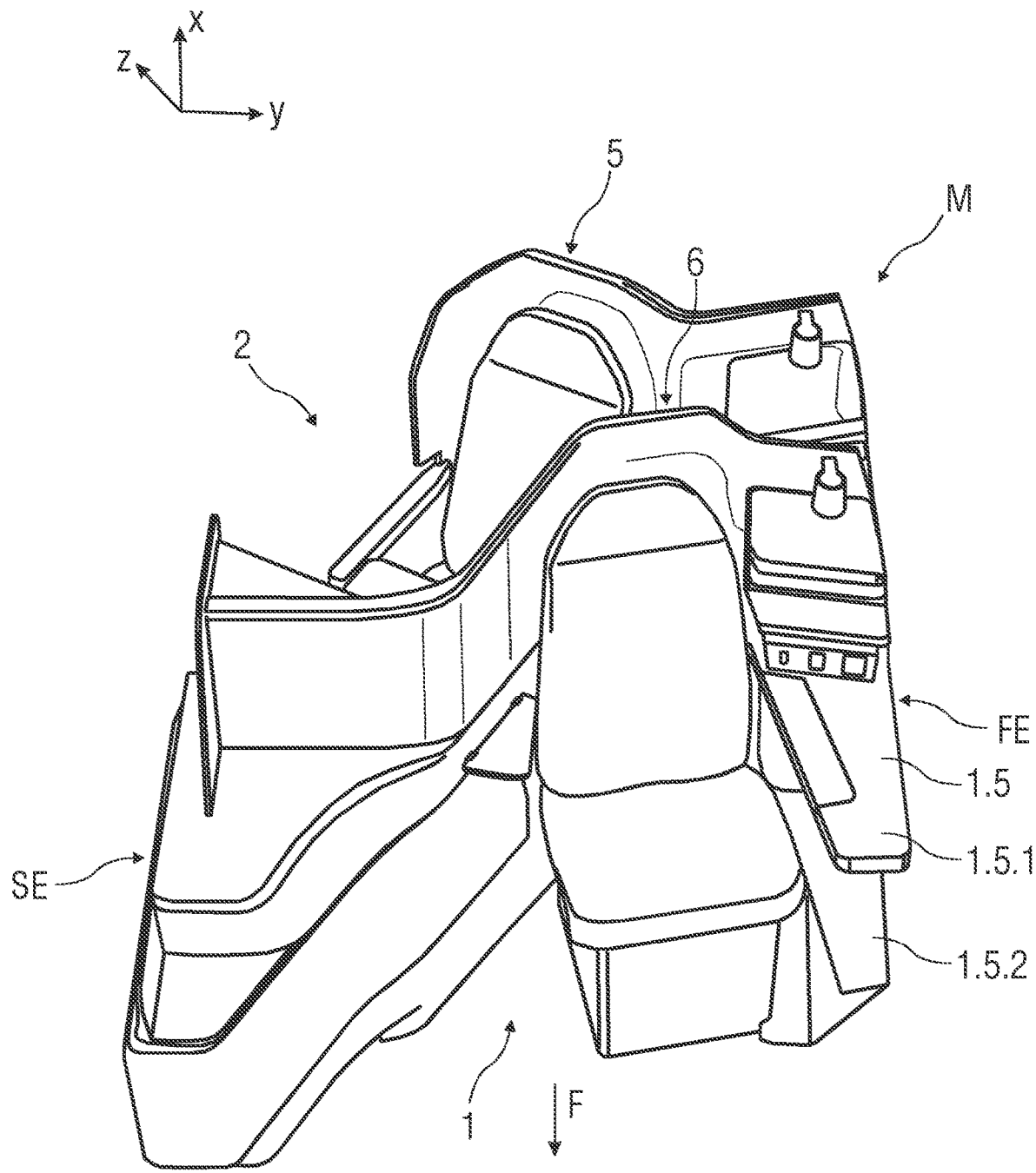
FIG. 7 shows schematically a perspective front view of an embodiment passenger module comprising two seats in a TTL-position.

FIG. 7 shows schematically a perspective front view of an embodiment passenger module M comprising two seats 1, 2 each shown in a TTL-position P1.

The passenger module M comprises a first side element FE and a second side element SE. The first side element FE and the second side element SE are arranged distanced from each other while extending parallel to each other. In particular, the first and second side elements FE, SE are extending parallel to the longitudinal axis x.

The first side element FE comprises a front console element 1.5 which is arranged adjacent the front seat 1. The front console element 1.5 comprises an upper surface 1.5.1 which can be used as an armrest by the front seat passenger or as a shelf to put down items such as a cup, magazines, entertainment devices etc.

In the shown embodiment, the front console 1.5 comprises a lower console portion 1.5.2, wherein the upper surface 1.5.1 is distanced from the lower console portion 1.5.2 in vertical direction. A space formed between the upper surface 1.5.1 and the lower console portion 1.5.2 can be used as storage and/or a lateral bed extension when the seat 1 is in the sleeping-position P2.

Figure 8A:
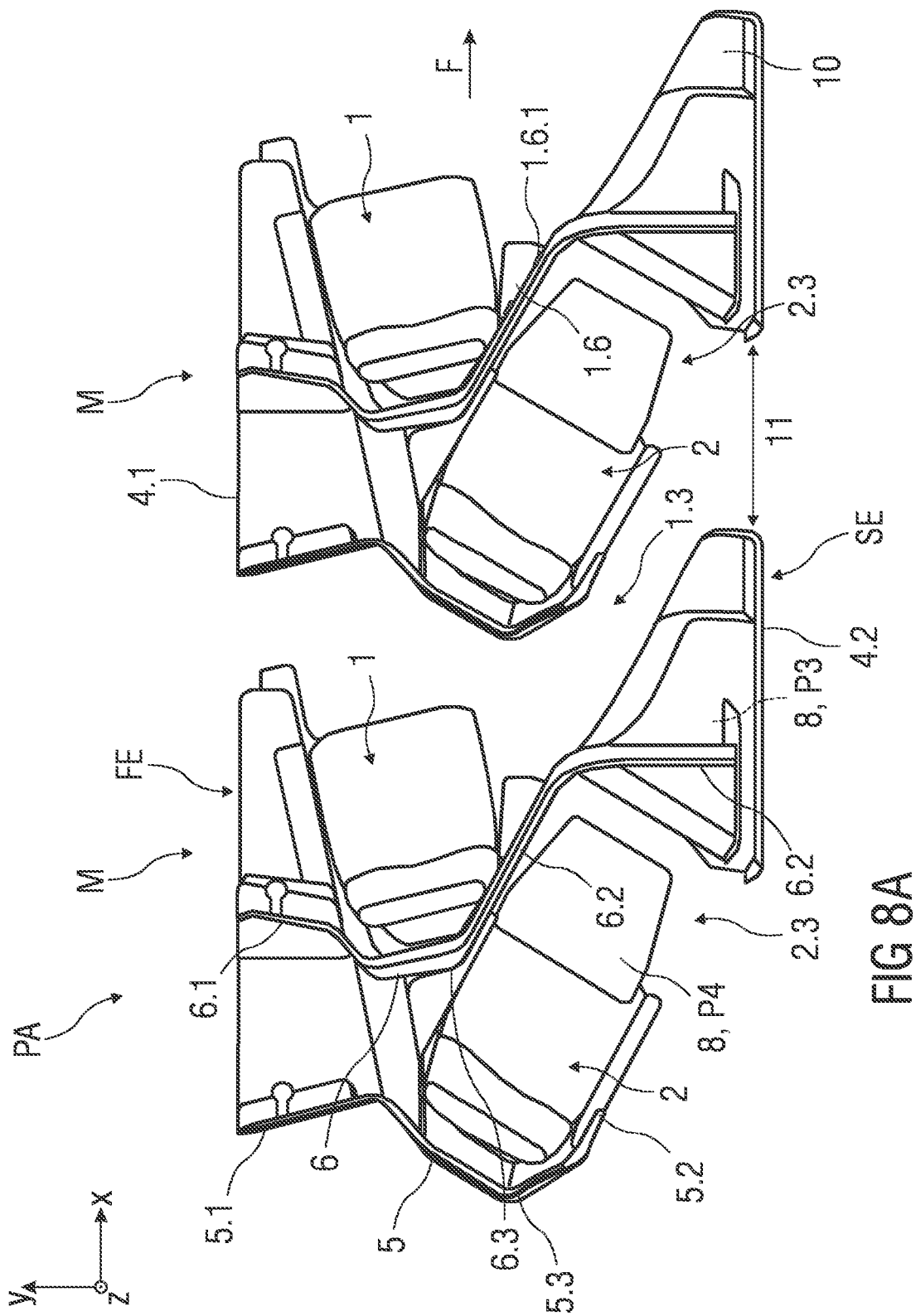
FIG. 8A shows schematically a top view of an embodiment of a passenger seating arrangement comprising two passenger modules.

FIG. 8A shows schematically a top view of an embodiment of a passenger seating arrangement PA comprising two passenger modules M arranged behind another.

Figure 8B:
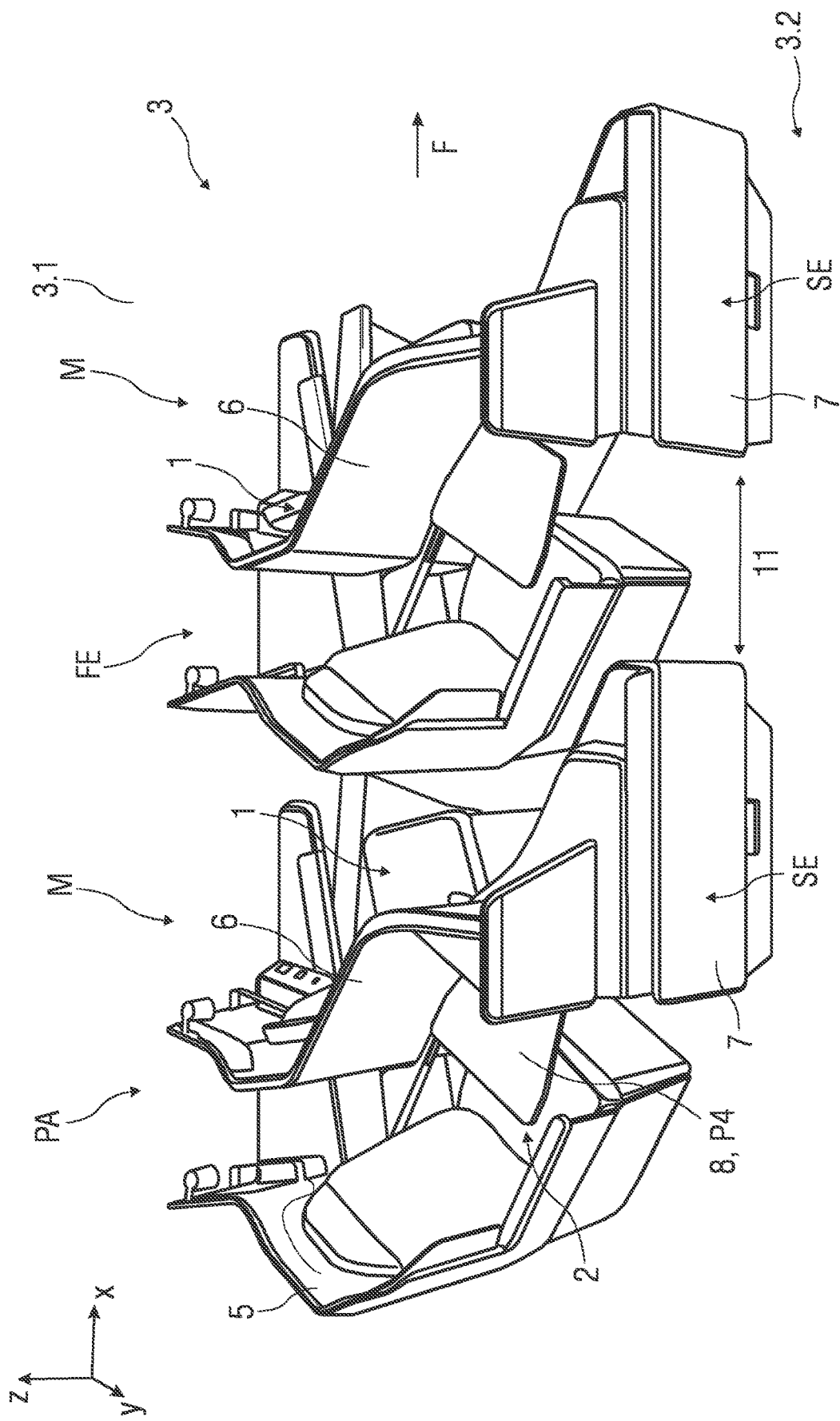
FIG. 8B shows schematically a perspective side view of the passenger seating arrangement according to FIG. 8A.

FIG. 8B shows schematically a perspective side view of the passenger seating arrangement PA according to FIG. 8A.

As shown in the FIGS. 8A and 8B the previously in FIG. 3 shown access divider element 10 can be excluded. This allows more access space 11 for the rear passenger of the front passenger module M as well as the front passenger of the rear passenger module M.

Further, FIGS. 8A and 8B show an embodiment of a tray table 8 which is not foldable but comprises dimensions which correspond with dimensions of the first and second side elements FE, SE such that the tray table 8 is fully stowable within the first and second side elements FE, SE when arranged in the non-use position P3.

FIG. 9 shows schematically a perspective view of an embodiment of a second side element SE of the passenger module M. For example, the second side element SE is configured as a compartment element 7 having a footwell 9 for a passenger of a rear seat 2. For instance, the adjustable seat 2 can be brought into the sleeping-position P2, in particular a bed position, such that the seat 2 is partially projecting into the footwell 9. Therefore, the compartment element 7 and a footwell space can be seen as an extension space for the rear passenger. When the seat is brought into the sleeping-position P2, the seat pan 2.1 or optionally a leg-rest can come into contact with a support surface portion 9.1 arranged inside the footwell 9 such that a sleeping surface is extended for the rear passenger. The support surface portion 9.1 has a corresponding shape with a shape of the seat pan 2.1 or optionally the leg-rest.

The invention claimed is:

1. A passenger module for a vehicle cabin having a longitudinal axis, the passenger module comprising:
    a first side element, a second side element, a front partition wall, and
    a front seat and a rear seat arranged between the first side element and the second side element, the front seat defining a front seat longitudinal axis angled toward the first side element;
    wherein the front partition wall is arranged between the two seats and connects the first side element and the second side element, the front partition wall dividing the first side element into a front console element and a rear console element arranged adjacent to the front seat and the rear seat, respectively; and
    wherein both the front console element and the rear console element have an outer side extending parallel to the vehicle cabin longitudinal axis and an inner side extending parallel to the front seat longitudinal axis.

2. The passenger module according to claim 1, wherein the front partition wall is arranged on top of each of the first side element and the second side element.

3. The passenger module according to claim 1, wherein the front partition wall extends perpendicularly from the first side element towards a rear of the front seat.

4. The passenger module according to claim 1, wherein the front partition wall extends perpendicularly from the second side element towards a rear of the front seat.

5. The passenger module according to claim 1, wherein the front partition wall has a curved section configured to partially enclose a backrest of the front seat.

6. The passenger module according to claim 1, wherein the front partition wall is configured to separate a rear passenger seating area and a front passenger seating area.

7. The passenger module according to claim 1, wherein the front partition wall is configured to form a continuously running wall between the first side element and the second side element.

8. The passenger module according to claim 1, wherein a passenger access path for a passenger of the rear seat is arranged behind the front partition wall extending in a direction towards the second side element.

9. The passenger module according to claim 1, wherein a passenger access path for a passenger of the front seat is arranged in front of the front partition wall extending in a direction towards the second side element.

10. The passenger module according to claim 1, wherein the second side element is configured as a compartment element having a footwell for a rear seat passenger.

11. The passenger module according to claim 1, wherein the first side element is arranged adjacent to a cabin wall and the second side element is arranged adjacent to an aisle.

12. A passenger module for a vehicle cabin having a longitudinal axis, the passenger module comprising:
    a first side element;
    a second side element at an aisle;
    a front partition wall;
    a front seat defining a front seat longitudinal axis angled toward the first side element; and
    a rear seat;
    wherein the front partition wall extends from the first side element behind a front seat towards the second side element; and
    wherein the first side element is divided by the front partition wall into a front console element and a rear console element arranged adjacent to the front seat and the rear seat, respectively;

wherein both the front console element and the rear console element have an outer side extending parallel to the vehicle cabin longitudinal axis along a cabin wall; and wherein both the front console element and the rear console element have an inner side extending parallel to the front seat longitudinal axis adjacent to the front seat and the rear seat.

13. The passenger module according to claim 12, wherein each console element has storage compartments for a corresponding passenger of each seat.

14. The passenger module according to claim 12, wherein the first side element and the second side element are each configured as a console.

15. The passenger module according to claim 12, wherein each console element has an upper utility surface for a corresponding passenger of each seat.

16. A passenger seating arrangement for a vehicle cabin having a longitudinal axis comprising at least two identical passenger modules, the at least two identical passenger modules including:
- a first side element;
- a second side element;
- a front partition wall; and
- a front seat and a rear seat arranged between the first side element and the second side element;

the front seat and the rear seat are arranged substantially one behind another and facing substantially in a same direction;

wherein the front partition wall is arranged on top of each of the first side element dividing the first side element into a front console adjacent to the front seat and a rear console adjacent to the rear seat, the front partition wall extending from the first side element behind a front seat towards the second side element;

wherein the passenger modules are arranged one behind another in a longitudinal direction of the vehicle cabin;

wherein both the front console and the rear console have an outer side at a cabin wall extending parallel to the vehicle cabin longitudinal axis along the front console and the rear console, and both the front console and the rear console have an inner side extending parallel to the longitudinal axis of the front seat adjacent to the front seat and the rear seat, respectively; and wherein the rear console has an upper utility surface for a rear seat passenger of a front passenger module and a footwell underneath the upper utility surface for a front seat passenger of a rear passenger module.

17. The passenger seating arrangement according to claim 16, wherein a front passenger seating area of a rear passenger module of the at least two identical passenger modules, a corresponding legroom, and passenger access path are delimited by a rear partition wall of a front passenger module of the other set of two passenger modules.

18. The passenger seating arrangement according to claim 16, wherein the front console and the rear console of the front passenger module are configured to form an extended footwell for the front seat passenger of the rear passenger module.

* * * * *